United States Patent

[11] 3,633,147

[72] Inventor Mario Polidori, Pennsauken, N.J.
[21] Appl. No. 15,177
[22] Filed Feb. 27, 1970
[45] Patented Jan. 4, 1972
[73] Assignee AMP Incorporated, Harrisburg, Pa.

[54] CONNECTOR FOR UNDERGROUND UTILITY APPLICATIONS
9 Claims, 9 Drawing Figs.

[52] U.S. Cl. .................................... 339/19, 339/61 M, 339/242, 339/268 R
[51] Int. Cl. .................................... H01r 31/08, H01r 13/30
[50] Field of Search .................................... 339/19, 60, 68, 263, 267, 268, 242, 59, 61, 94

[56] References Cited
UNITED STATES PATENTS

| | | | |
|---|---|---|---|
| 2,087,384 | 7/1937 | Lee | 174/72 |
| 2,583,804 | 1/1952 | Andrus | 171/252 |
| 3,173,988 | 3/1965 | Martahus et al. | 174/75 |
| 3,183,476 | 5/1965 | Sacks et al. | 339/242 |
| 3,292,134 | 12/1966 | Moulin | 339/192 |
| 3,577,114 | 5/1971 | Hawkins | 339/94 |

Primary Examiner—Marvin A. Champion
Assistant Examiner—Robert A. Hafer
Attorneys—Curtis, Morris and Safford, William J. Keating, Ronald D. Grefe, William Hintze, Adrian J. La Rue, Frederick W. Raring, Jay L. Seitchik and John P. Vandenburg ABSTRACT: The disclosure relates to an electrical connector of the type used in underground utility applications wherein a number of secondary cables may be terminated to a commoning plate and wherein any one of the cables may be detached from the commoning plate without disturbing the other cables. The connector comprises a commoning block of electrically conducting material, preferably aluminum, having tapered holes therethrough, for receiving an electrical cable with connector thereon. The connector makes watertight fit with a reamed out portion of the commoning plate and is secured thereto, a watertight member being positioned on the opposite side of the commoning block to provide a watertight underground connection.

PATENTED JAN 4 1972

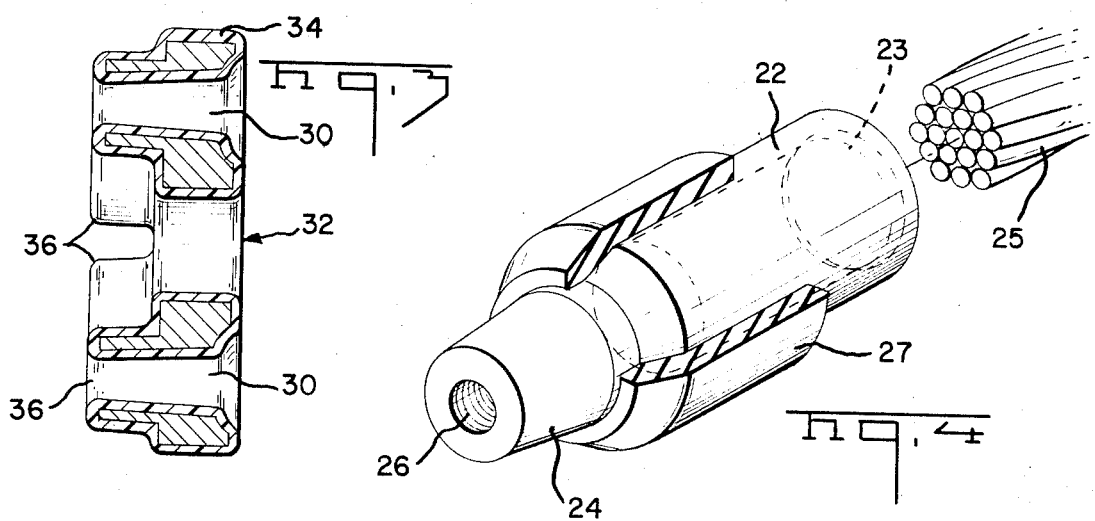
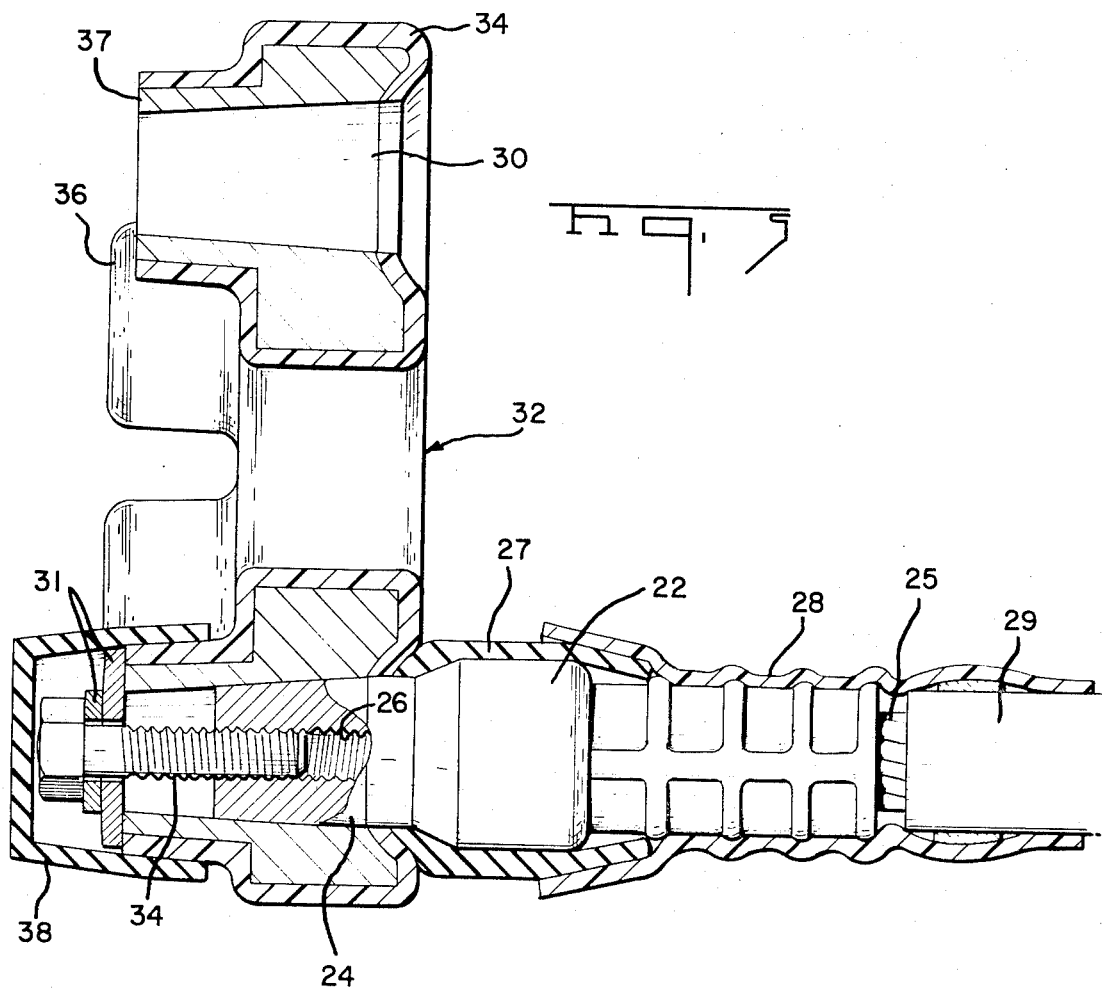

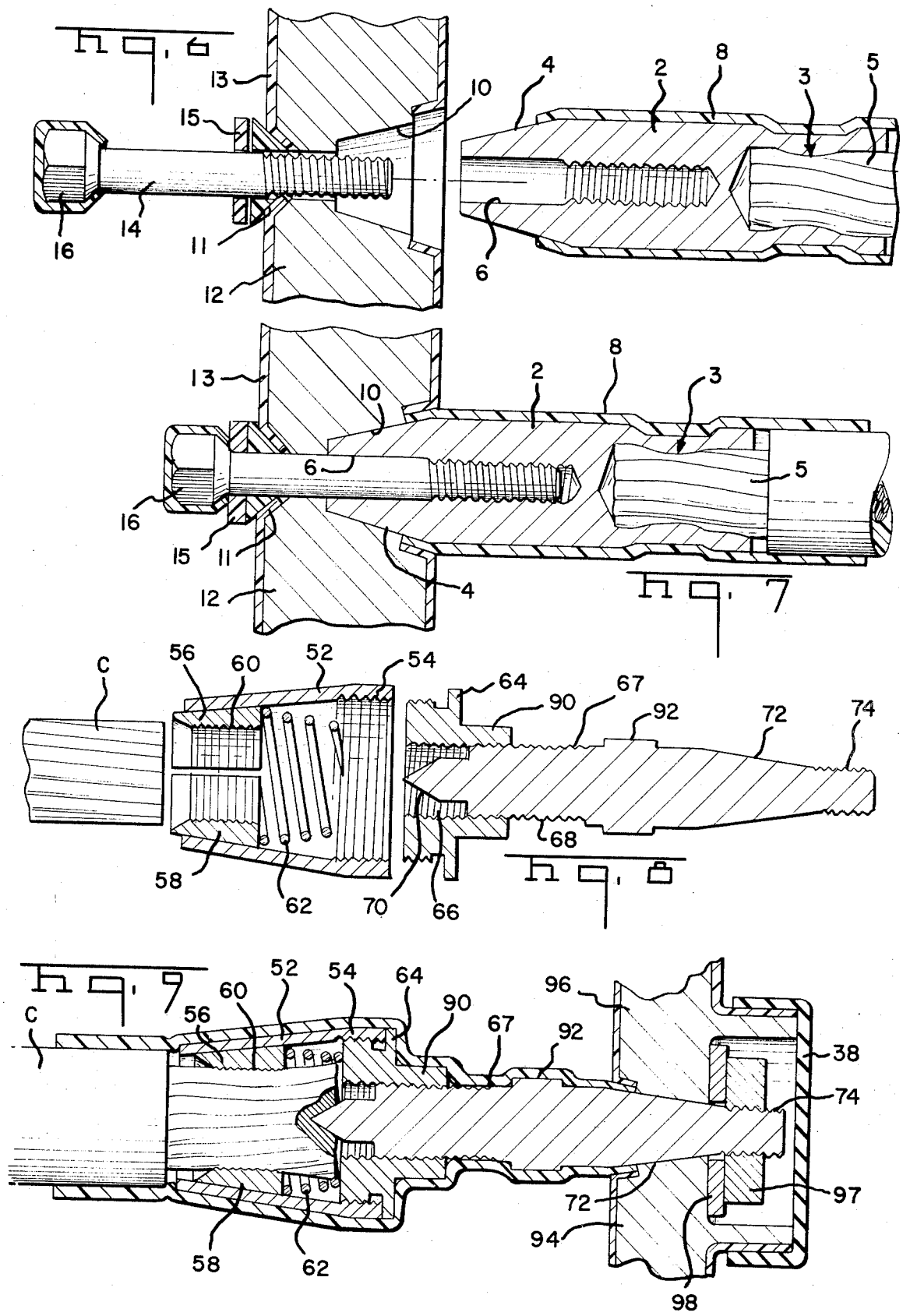

CONNECTOR FOR UNDERGROUND UTILITY APPLICATIONS

This invention relates generally to electrical connectors of the type used in underground utility applications, and more specifically, to an underground preinsulated commoning plate for receiving plural secondary cables therein and providing a watertight fit therewith.

With the continuing improvements in wire insulation, it has been found highly desirable from an aesthetic as well as from an economic sense to place electrical cabling underground rather than on utility poles and the like. Such arrangements eliminate the unsightly utility pole from residential communities, provide additional safety and also eliminate the costly installation of such utility poles and the requirement that electrical cables be serviced at great heights rather than at the more easily accessible underground locations. The use of such underground electrical wiring has led to requirement of underground connectors and commoning blocks which also have the properties of the cable installation of the present state of the art in that such connectors and commoning blocks or plates can be made watertight and substantially uncorrodable, even when connected to a plurality of cables while underground.

In accordance with the present invention, there is provided an electrically and hermetically insulating commoning plate for underground use and for connection to electrical cable and a connector for such electrical cable for making a watertight connection with the commoning plate of the present invention. Briefly, the above is provided by the use of a commoning plate which is formed of an electrically conductive material, such as aluminum, having a plurality of apertures therethrough, the commoning plate being preinsulated by forming an insulating and watertight laminate or coating thereon. In one embodiment, the apertures can have the insulating coating removed or, according to a second embodiment, the apertures are also coated, the apertures being reamed out individually upon requirement for the use of same to expose the conductive material for connection to a connector member. The connector member, according to a first embodiment, is made out of an electrically conductive material such as aluminum and is crimped at one end thereof over a cable which is positioned within a recess or aperture within the connector element to secure the cable to the connector member. The connector member also includes a threaded portion at its forward end for receiving a bolt, the connector member having a heat-shrinkable insulating coating thereon for mating with the commoning block. The connector is positioned within the recess in the commoning block to make a watertight fit therewith, the bolt being fed through the opposite end of the aperture and through an insulating bushing to mate with the connector and secure the connector within the aperture, simultaneously making a watertight seal between the connector and the commoning block. According to the second embodiment, an aluminum connector member is provided having a recess at its rearward portion and a threaded recess at its forward portion with a resilient cylindrically shaped portion around the midpoint thereof and tapered toward the front end of the cylindrical portion. A cable is placed in the rearward recess of the connector and crimped therein by crimping down on the connector portion at the rearward portion thereof. The heat shrinkable sleeve is then positioned over the cable insulation and extends over the annular resilient rubber portion thereof and is then heated to provide a watertight fit with the cylindrical resilient member and the wire cable insulation. The cable is now prepared for installation into the commoning block by insertion of the cable with connector into one end of the aperture thereof and securing of the connector thereto by means of a bolt and washer placed into the connector through the opposite end of the commoning block. A watertight material such as a rubber boot or the like is then placed over the bolt secured to the commoning block to provide a watertight seal. The above connector and method provides a relatively inexpensive connector for a cable which can be easily and quickly inserted and installed on site with minimal use of tools and without requiring highly skilled personnel.

It is therefore an object of this invention to provide a preinsulated connector arrangement capable of receiving plural secondary cables for termination to a commoning plate.

It is a further object of this invention to provide a preinsulated connector arrangement for connection to a commoning plate which is substantially watertight in underground applications.

It is a further object of this invention to provide a connector and commoning plate for electrical cable which is relatively inexpensive to produce and which can be installed without the requirement of sophisticated tooling or highly trained personnel.

The above objects and still further objects of this invention will immediately become apparent to those skilled in the art after consideration of the following specified preferred embodiments thereof which are provided by way of example and not by way of limitation wherein:

FIG. 3 is a cross section of a commoning block in accordance with the first embodiment of the invention;

FIG. 4 is an exploded view of a cable and connector according to a first embodiment prior to completion thereof;

FIG. 5 is a sectional view of the connector and cable in accordance with the first embodiment of the invention after termination to a cable and insertion into a commoning block;

FIG. 6 is a cross-sectional view of a commoning block and connector in accordance with the second embodiment of this invention prior to connection;

FIG. 7 is a cross-sectional view of a commoning block and connector in accordance with a second embodiment of the invention after connection;

FIG. 8 is an exploded view in cross section of a third embodiment of a conductor and commoning plate in accordance with the present invention; and FIG. 9 is a cross-sectional view of the third embodiment of the invention after connection.

Figures 1, 2:
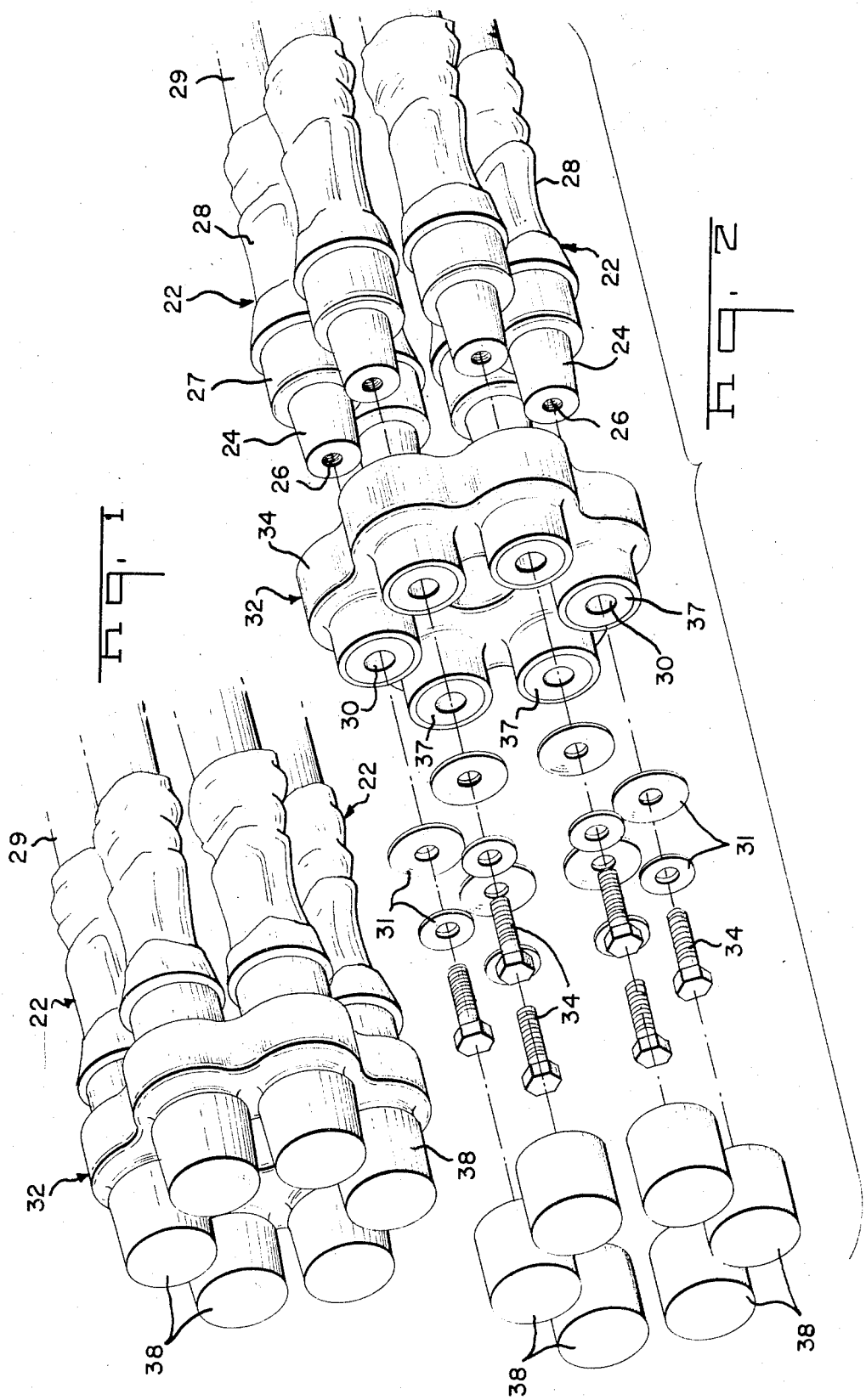
FIG. 1 is a perspective view of a commoning block with connectors secured thereto according to a first embodiment of the invention.
FIG. 2 is an exploded view of the embodiment of FIG. 1.

Referring now to FIGS. 1 to 5 there is shown a first embodiment of a connector and commoning plate or block in accordance with the present invention. With specific reference to FIG. 1, there is shown the commoning block 32 which receives connectors 22 having cables 25 secured to the connectors, the connectors making a watertight fit with the commoning block. The commoning block also includes boots 38 for providing a watertight seal at the opposite end thereof.

Referring now more specifically to FIGS. 2 and 5, there is provided a cylindrical electrical connector or terminal 22, preferably of aluminum, which has a cable-receiving aperture 23 in one end thereof and a tapered nose portion 24 with a threaded aperture 26 on the other end thereof. The connector member 22 is secured to a cable 25 by crimping the connector member 22 over the aperture region 23 thereof while the cable 25 is inserted therein (FIG. 5) to provide an electrically and mechanically tight connection. Positioned atop the connector member 22 is a cylindrically shaped resilient piece 27, preferably of rubber or the like, which is tapered toward its forward region and will be utilized later to form a watertight shield with the commoning plate 32 as will be explained in more detail hereinbelow. A sleeve of insulating material 28 (FIG. 5) which is heat shrinkable is then placed over the crimped portion of the connector 22 and extends forwardly over the cylindrical member 27 and rearwardly over the insulation 29 of the cable 25. The sleeve 28 is then shrunk around the connector member 22 by heating to provide an insulating and watertight fit between the cylindrical member 27 and the insulation 28.

The commoning plate 32 is shown in greater detail in FIGS. 3 and 5. In the commoning plate of FIGS. 3 and 5, there is provided an electrically conductive body, preferably of aluminum, having a plurality of apertures 30 therethrough, the entire commoning plate 32 including the apertures 30 thereof being coated with an insulating and waterproof material 34 of well-known type. When it is desired to make an electrical connection thereto, the apertures 30 thereof are reamed out, as shown in FIG. 5, to remove a portion of the insulating material 34 and the rear portion 36 of the aperture 30 is ground down to provide a flat surface 37 thereof for receiving a washer 34 or the like thereover as will be explained hereinbelow. The connector of FIGS. 4 and 5, along with the cable attached thereto, is then placed into the aperture 30 as shown in FIG. 5 and a bolt 34 having a washer 31 thereover is rotated into the threaded aperture 26 of the connector 22 to bring the connector 22 into intimate contact with the reamed out portion of the commoning block 32 as shown in FIG. 5. It will be seen that the cylindrical member 27 will be placed in intimate contact with the insulation 34 of the commoning block 32 to provide a watertight fit at one end thereof. After securing the bolt 34 tightly to the connector 22, a boot 38 will be placed over the rear portion of the commoning block 32 to provide a watertight covering over the bolt 34 and washer 31. It should be understood that in place of the boot 38, a waterproofing and insulating material can be deposited over the bolt 34 and washer 31 to provide a covering and to provide the desired watertight nature of the connection.

Referring now to FIGS. 6 and 7, there is shown a connector arrangement in accordance with the second embodiment of the present invention which includes a cylindrical connection member or electrical terminal 2 preferably of aluminum, which has a cable-receiving aperture 3 in one end thereof, and a tapered nose portion 4 with a threaded aperture 6 on the other end thereof. The connector member 2 is secured to a cable 5 by crimping the connector member 2 over the aperture region 3 thereof while the cable 5 is inserted therein to provide an electrically and mechanically tight connection. A sleeve of insulating material 8 which is heat shrinkable is then placed over the crimp of the connector 2 and extends forward to the tapered portion 4 thereof and is then shrunk around the connector member 2 by heating same. The insulating material 8 is also positioned backward to extend over the insulation of the cable conductor 5.

There is shown a commoning plate or block 12 which is formed from electrically conductive material, such as aluminum. The plate 12 has a plurality of apertures 10 on one side thereof and an inward taper 11 at the opposite sides thereof. The inward taper 11 is designed to mate with the tapered portion 4 of the connector member 2. A layer of insulation 13 is formed over the entire commoning plate 12 with the exception of the tapered region 10 which will mate with the tapered portion 4. The insulation can be placed on the commoning plate by dipping the plate into a liquid insulating medium after which it solidifies or by other well-known methods.

Also associated with the commoning plate and the connector 2 is a bolt 14 having an insulated head 16 with a forward taper thereon and a bushing 15 of Teflon or the like for mating with the recess 11.

For securing the cable 5 with conductor 2 to the commoning block 12 the cable and connector are positioned within the aperture 10 and the bolt 14 is fed through the aperture 10 into the threaded aperture 6 and is rotated therein for securing the connector 2 into the commoning plate 12 as shown more clearly in FIG. 7. It can be seen that the insulation sleeve 8, positioned on the connector 2, makes intimate contact with the insulation 13 on the commoning plate 12. In addition, the Teflon bushing 15 will make intimate contact with the insulation 13 of the commoning plate and the insulated head 16 will make intimate contact with the bushing 15 to provide a watertight connection for underground use.

Referring now to FIG. 8 there is shown a third embodiment of a connector which includes a tapered outer aluminum shell 52, one end of which is internally threaded as at 54. A pair of tapered gripping jaws 56 and 58 with internal serrations 60 is disposed in the small end of the shell 52. A spring 52 may be used in the connector to keep the jaws 56 and 58 in axial position before the connector is used.

Also included is an externally threaded body member 64 which is adapted to be threaded into shell 52 by means of the threaded pointed ends 70 thereof. As can be seen body member 64 has wrench flats 90 on the outer surface thereof by which the parts may be tightened together. Body member 64 also includes a threaded axial passageway 66 therethrough.

Referring still to FIG. 8, a cylindrical pin member or electrical terminal 67 with a threaded end 68 terminating in a point 70 is provided Member 67 has wrenched flats 92 on the outer surface thereof. The other end of 67 is tapered at 72, and terminates in a reduced threaded section 74.

In use, referring now to FIG. 9, a connector housing shell 52 is assembled with the gripping jaws 60 and 58 therein and with body 64 threaded into its associated counterpart. Pin member 67 is loosely threaded into passageway 66 of body 64. A cable C is pushed into housing member 52, during which time jaws 56 and 58 open in their tapered section to embrace the cable conductor C. At this time, spring 62 keeps jaws 56 and 58 biased against the cable conductor. Pin member 67 is then tightened into body 64 by a wrench. During the tightening of member 67, pointed end 70 pushes against the end of the cable conductor to tighten jaws 56 and 58 in their tapered section. Pointed end 70 subsequently enters and spreads the cable strands, as best shown in FIG. 9, to provide a secure mechanical and electrical connection.

Referring still to FIG. 9 the connector with cable attached is secured to a commoning plate or block 94 having insulation 96 thereon in a manner similar to those previously discussed with reference to the first and second embodiments herein. It should be noted that the outer shell 56 and the body 64 may be made in one piece by conventional spin-forming techniques. The threaded portion 74 is secured to the commoning plate 94 by a nut 97 and washer 98. An insulating and watertight boot 99 is positioned over the nut and washer.

Through the invention has been described with respect to specific preferred embodiments thereof, many variations and modifications thereof will immediately become apparent to those skilled in the art. It is therefore the intention that the appended claims be interpreted as broadly as possible in view of the prior art to include all such variations and modifications.

What is claimed is:

1. A connector for an underground utility application, comprising: a block of conductive material, a coating of insulation and sealing material covering said block, said block being provided with a plurality of apertures extending entirely through said block, each of said apertures including a tapered sidewall, portions of said coating encircling each end of said apertures, an electrically conductive terminal having a recessed portion at one end thereof for connection to an electrical cable, the other end of said terminal being tapered and of a configuration complimentary to the tapered sidewall of each of said tapered apertures provided in said block, said tapered end being received in mating registration within a tapered sidewall of a selected aperture provided in said block, sleeve-sealing means of insulation material encircling a portion of said electrical terminal, threaded connection means protruding from the end of said tapered end and received in said selected aperture, and covering means positively connected to said threaded connection means, said covering means and said sleeve-sealing means overlying and in sealing compression against said coating portions encircling respectively said ends of the selected aperture provided in said block, said threaded connection means cooperating with said sleeve-sealing means and said covering means and simultaneously applying sealing compression of said sleeve-sealing means and said covering means against said coating.

2. The structure as recited in claim 1, wherein, said block is provided with a tapered recess communicating with one end of said selected aperture provided in said block, said coating portion which encircles said one end of said selected aperture is covering said recess, and said sleeve-sealing means is in registration with said recess as well as overlying said coating.

3. The structure as recited in claim 1, wherein, said covering means includes a washer and a waterproofing and insulating covering provided on said threaded connection means and on said washer.

4. The structure as recited in claim 1, wherein said covering means is received over and attached to said threaded connection means.

5. The structure as recited in claim 1, and further including: a heat-shrinkable sleeve of insulation material received over said sleeve-sealing means and over the recessed portion of said terminal.

6. The structure as recited in claim 1, wherein, said sleeve-sealing means encircles and covers said recessed portion of said terminal.

7. The structure as recited in claim 1, wherein said threaded connection means includes external threads, and further including: securing means threadedly connected on said threaded connection means for positively securing said terminal to said block.

8. The structure as recited in claim 1, wherein, said tapered sidewalls of each of said apertures extend entirely through said block to define a tapered bore.

9. The structure as recited in claim 4, wherein said covering means includes a bushing.

* * * * *